(12) United States Patent
Tsukada et al.

(10) Patent No.: US 8,426,067 B2
(45) Date of Patent: Apr. 23, 2013

(54) COMPOSITE ELECTRODE FOR ELECTRICITY STORAGE DEVICE, METHOD FOR PRODUCING THE SAME AND ELECTRICITY STORAGE DEVICE

(75) Inventors: Yoshiko Tsukada, Yokohama (JP); Mori Nagayama, Yokohama (JP); Nobutaka Chiba, Yokohama (JP); Masashi Ishikawa, Suita (JP)

(73) Assignees: Nissan Motor Co., Ltd., Yokohama-shi (JP); A School Corporation Kansai University, Suita-shi (JP)

( * ) Notice: Subject to any disclaimer, the term of this patent is extended or adjusted under 35 U.S.C. 154(b) by 153 days.

(21) Appl. No.: 13/126,122

(22) PCT Filed: Oct. 27, 2009

(86) PCT No.: PCT/JP2009/068435
§ 371 (c)(1),
(2), (4) Date: Apr. 26, 2011

(87) PCT Pub. No.: WO2010/050484
PCT Pub. Date: May 6, 2010

(65) Prior Publication Data
US 2011/0206993 A1 Aug. 25, 2011

(30) Foreign Application Priority Data

Oct. 27, 2008 (JP) ................................. 2008-275610
May 18, 2009 (JP) ................................. 2009-119613

(51) Int. Cl.
 H01M 4/12 (2006.01)
 H01M 4/50 (2010.01)
 H01M 4/00 (2006.01)
 H01M 4/88 (2006.01)

(52) U.S. Cl.
 USPC ...... 429/231.5; 429/224; 429/223; 252/182.1

(58) Field of Classification Search ............... 429/231.5, 429/224, 223; 252/182.1
 See application file for complete search history.

(56) References Cited

U.S. PATENT DOCUMENTS

| 5,173,215 A | 12/1992 | Clarke |
| 5,281,496 A | 1/1994 | Clarke |
| 7,838,153 B2 | 11/2010 | Sumihara et al. |

FOREIGN PATENT DOCUMENTS

| JP | 6-302315 A | 10/1994 |
| JP | 2002-158140 A | 5/2002 |
| JP | 2005-252217 A | 9/2005 |
| JP | 2007-220585 A | 8/2007 |
| JP | 2008-103118 A | 5/2008 |
| JP | 2008-171802 A | 7/2008 |
| JP | 2008-181763 A | 8/2008 |
| JP | 2008-305781 A | 12/2008 |
| WO | WO 92/14683 A1 | 9/1992 |
| WO | WO 2008/026595 A1 | 3/2008 |

*Primary Examiner* — Helen O Conley
(74) *Attorney, Agent, or Firm* — Foley & Lardner LLP

(57) ABSTRACT

A composite electrode for an electricity storage device of the present invention includes: a substrate; a whisker or a fiber which is made of at least one of a metal and a metal compound and is formed on the substrate; and a coating layer which contains an active material and is formed on at least a part of a surface of the whisker or the fiber.

14 Claims, 13 Drawing Sheets

(a)

(b)

(a)

(b)

(a)

(b)

(a)

(b)

COMPOSITE ELECTRODE FOR ELECTRICITY STORAGE DEVICE, METHOD FOR PRODUCING THE SAME AND ELECTRICITY STORAGE DEVICE

TECHNICAL FIELD

The present invention relates to a composite electrode for an electricity storage device, a method for producing the same and an electricity storage device. More specifically, the present invention relates to a composite electrode for an electricity storage device, the composite electrode including predetermined whiskers or fibers, which are formed on a substrate, and including a predetermined coating layer formed on surfaces of the whiskers or the fibers, to a method for producing the composite electrode, and to an electricity storage device using the composite electrode for the electricity storage device.

BACKGROUND ART

Heretofore, there has been proposed an electrochemical capacitor that allows to generate electrochemical capacitance by depositing titanium oxide and the like on surfaces of activated carbon fibers (refer to Patent literature 1).

Moreover, there has been proposed an electrochemical capacitor that allows to generate the electrochemical capacitance by forming amorphous oxide whiskers (refer to Patent literature 2).

Furthermore, there has been proposed a lithium-ion secondary battery using, as an electrode, a substrate on which tungsten oxide whiskers and the like are formed (refer to Patent literature 3).

CITATION LIST

Patent Literature

Patent literature 1: Japanese Patent Unexamined Publication No. 2002-158140
Patent literature 2: Japanese Patent Unexamined Publication No. 2005-252217
Patent literature 3: Japanese Patent Unexamined Publication No. 2008-181763

SUMMARY OF INVENTION

Technical Problem

However, in the electrochemical capacitor described in the patent literature 1 described above, most of the capacitance results from the oxide, the activated carbon fibers themselves only ensure electric double layer capacitance, and there has been a problem that sufficient capacitance is not obtained.

Moreover, in the electrochemical capacitor described in the patent literature 2 described above, whiskers with a single composition are used, and accordingly, there has been a problem that it is difficult to strike a balance between the capacitance and conductivity.

Furthermore, the electrode in the lithium ion battery described in the patent literature 3 described above has preferred performance; however, there has been room for improvement in further increase of the capacitance.

The present invention has been made in consideration of the problems as described above, which are inherent in the conventional technologies. It is an object of the present invention to provide a composite electrode for an electricity storage device, which is capable of generating high capacitance and excellent responsiveness, to provide a method for producing the composite electrode, and to provide an electricity storage device using the composite electrode for the electricity storage device.

Solution to Problem

As a result of repeating the assiduous examination in order to achieve the foregoing object, the inventors of the present invention have found out that the foregoing object can be achieved by forming a predetermined coating layer on surfaces of predetermined whiskers or fibers formed on a substrate, and the inventors have come to complete the present invention.

Specifically, a composite electrode for an electricity storage device according to the present invention includes: a substrate; a whisker or a fiber made of at least one of a metal and a metal compound, the whisker or the fiber being formed on the substrate; and a coating layer containing an active material, the coating layer being formed on at least a part of a surface of the whisker or the fiber.

Moreover, an electricity storage device according to the present invention includes: the composite electrode for the electricity storage device according to the present invention; and an electrolyte.

Furthermore, a method for producing a composite electrode for an electricity storage device according to the present invention is a method for producing the composite electrode for the electricity storage device, the composite electrode being according to the present invention, the method including the following steps (1) and (2):

(1) performing heat treatment for a raw material or a precursor of the substrate containing a constituent metal of the whisker or the fiber in an oxidizing atmosphere, and forming the whisker or the fiber on the substrate; and (2) after the step (1), forming the coating layer containing the active material on at least a part of the surface of the whisker or the fiber.

Advantageous Effects of Invention

In accordance with the present invention, such a configuration is adopted, which includes: the substrate; the whisker or the fiber which is made of at least one of the metal and the metal compound and is formed on the substrate; and the coating layer which contains the active material and is formed on at least a part of the surface of the whisker or the fiber. Accordingly, there can be provided the composite electrode for the electricity storage device, which is capable of generating high capacitance and excellent responsiveness, the method for producing the composite electrode for the electricity storage device, and the electricity storage device using the composite electrode for the electricity storage device.

DESCRIPTION OF EMBODIMENTS

First Embodiment

Figure 1:
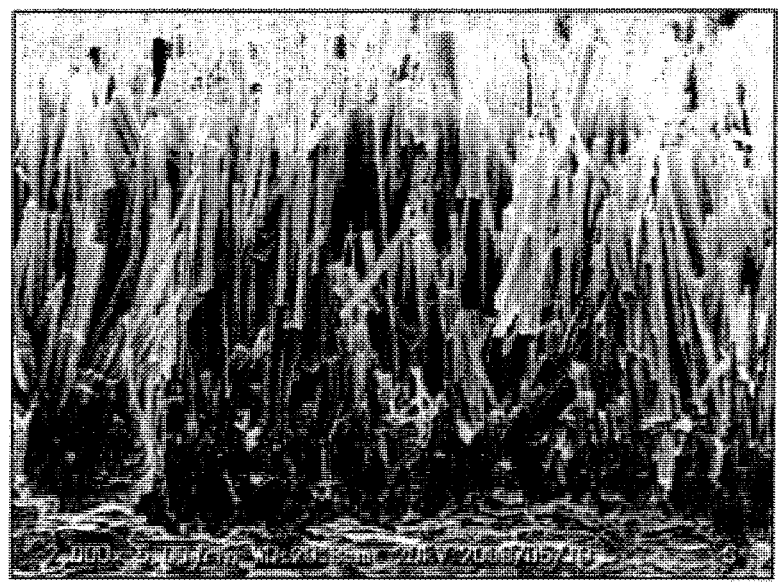
FIG. 1(a) is a cross-sectional SEM photograph of a pre-composite electrode obtained in Example 1(A)
FIG. 1(b) is a top plan SEM photograph thereof.
Figure 1:
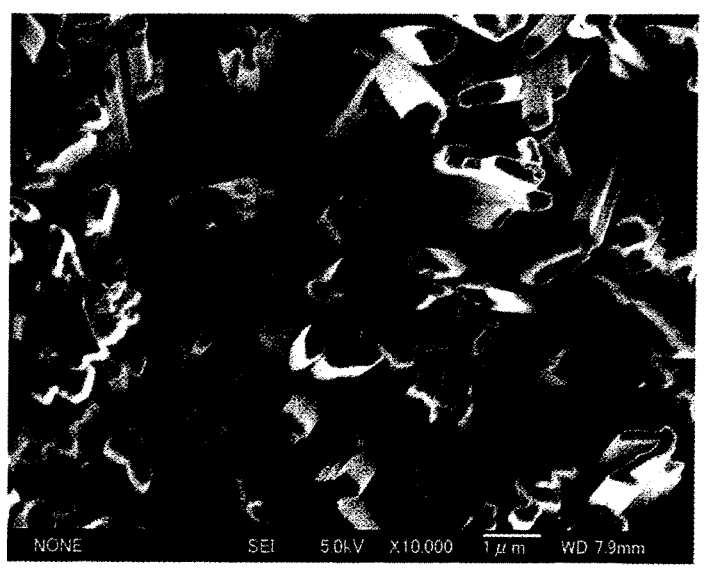

A description is made below in detail of a composite electrode for an electricity storage device according to a first embodiment of the present invention, a method for producing the composite electrode, and the electricity storage device.

Note that, in these specification and claims, a "main component" refers to a component that is contained by 50% by mass or more with respect to a total amount of constituent components in each of regions, the total amount being taken as a reference.

First, a description is made in detail of the composite electrode for the electricity storage device according to the first embodiment of the present invention.

The composite electrode for the electricity storage device according to the first embodiment includes: a substrate; whiskers or fibers, which are formed on the substrate, and are made of at least one of metal and a metal compound; and an active material-containing coating layer formed on at least a part of surfaces of the whiskers or the fibers.

Then, such whiskers or fibers have higher electric conductivity than such an active material.

With such a configuration, high capacitance and excellent responsiveness can be exhibited.

Note that each of the whiskers and the fibers can be applied singly or in combination with the other.

The coating layer is not particularly limited as long as the coating layer is formed on at least a part of the surfaces of the whiskers or the fibers, and contains the active material. However, it is desirable that the coating layer be formed, for example, substantially entirely on the surfaces of the whiskers or the fibers.

With such a configuration, in the case where the whiskers are used at a potential exceeding a stable potential range, effects exerted by the present invention can be exhibited more stably.

Moreover, with regard to the coating layer, for example, in the case where it is formed on the plurality of whiskers or fibers, it is desirable that gaps be provided among portions of the coating layer formed on the surfaces of the adjacent whiskers or fibers. That is to say, it is desirable that the coating layer be formed without completely filling the gaps among the whiskers or the fibers.

With such a configuration, electrolyte or solvent molecules can smoothly move among the whiskers or the fibers, which have the coating layer, the capacitance is not inhibited from being generated, and more excellent responsiveness can be exhibited.

Moreover, the number of stacks of the coating layer may be single or plural, and is not particularly limited. For example, such a coating layer including a layer, which exhibits an electricity collecting function, on a surface of a layer containing the active material can be mentioned as a preferred example. Moreover, for example, a coating layer composed by stacking two coating layers containing active materials with compositions different from each other can be mentioned as a preferred example. As a specific preferred example, there can be mentioned a coating layer, in which an active material with a relatively small volume shrinkage ratio is arranged in a first layer serving as an inner layer, and a high-capacity active material with a relatively large volume shrinkage ratio is arranged in a second layer serving as an outer layer.

Note that the capacitance and responsiveness of the composite electrode for the electricity storage device are basically in a trade-off relationship. However, the capacitance and responsiveness of the composite electrode for the electricity storage device can be appropriately controlled by a thickness of such a coating layer and an amount of the active material in the coating layer.

With such a configuration, for example, not only the above effects exerted by the present invention can be exhibited, but also excellent cycle characteristics can be exhibited.

Moreover, it is required that the coating layer at least contain the active material that generates the electrochemical capacitance. As such an active material, for example, metal, a semiconductor, a metal compound (oxide or the like), and an organic compound can be mentioned. One type of these can be used singly, or plural types thereof can be used while being appropriately mixed with one another.

Note that it is not necessary that all of materials which compose the coating layer be active materials, and for example, the coating layer can also be mixed with a material that adjusts a volume change, or can also be composited with a conductive material.

Moreover, as a specific example of the active material contained in the coating layer, for example, there can be mentioned oxide of manganese, nickel, tin, indium, vanadium, cobalt, titanium, silicon or ruthenium. Furthermore, mixed or composite oxide according to an arbitrary combination of these can be mentioned.

With such a configuration, in particular, adherence of the coating layer onto the whiskers or the fibers, which are made of electrically-conductive oxides, is enhanced. Accordingly, more excellent responsiveness and excellent cycle characteristics can be exhibited.

The whiskers or the fibers are not particularly limited. However, such whiskers or fibers, which are made of the electrically-conductive oxides, can be used.

With such a configuration, the whiskers or the fibers are capable of not only playing a role of current collectors but also, for example, functions as active materials by themselves. Moreover, for example, the whiskers or the fibers are capable of enhancing interface adherence thereof onto an oxide active material, the interface adherence being a particularly important factor of the coating layer. In such a way, internal resistance of the composite electrode can be reduced, and more excellent responsiveness can be exhibited.

As a specific example of the whiskers or the fibers, for example, whiskers or fibers of tungsten oxide can be mentioned. It is desirable that, on surfaces of such tungsten oxide, a structure be formed, in which pseudo-capacitance by adsorption/desorption or intercalation of positive ions is generated. Moreover, from a viewpoint of obtaining excellent electric conductivity, it is desirable that the whiskers or the fibers contain, as a main component, a structure of $WO_x$ ($2<x<3$), and in particular, a structure of $W_{18}O_{49}$.

With such a configuration, more excellent responsiveness can be exhibited.

Moreover, as the specific example of the whiskers or the fibers, for example, whiskers or fibers of molybdenum oxide can also be mentioned. It is desirable that, also on surfaces of such molybdenum oxide, the structure be formed, in which the pseudo-capacitance by the adsorption/desorption or intercalation of the positive ions is generated.

Furthermore, as the whiskers, for example, those with an average diameter ranging approximately from 0.01 to 10 µm and an average length ranging approximately from 1 to 1000 µm can be used. Moreover, in general, the whiskers adopt a configuration of only trunk portions. However, besides this, they sometimes adopt a configuration of a branched shape, a braid shape, a pilling shape or the like. Furthermore, unless the purpose inherent in the composite electrode for the electricity storage device and other production steps thereof are inhibited by the formation of the whiskers, the whiskers can be basically formed on arbitrary regions on the substrate of the composite electrode for the electricity storage device.

Meanwhile, as the fibers, for example, those with an average diameter ranging approximately from 0.01 to 1 µm and an average length ranging approximately from 1 µm to 10 cm can be used.

The substrate is not particularly limited. However, for example, at least one of an alloy and ceramics, each of which contains at least one of the above-mentioned metal and metal compound, which compose the whiskers or the fibers, can be used.

With such a configuration, adherence of the whiskers and the fibers onto the substrate is enhanced more, and electrical contact therebetween is also enhanced. Accordingly, the internal resistance of the composite electrode can be reduced, and more excellent responsiveness can be exhibited.

Note that, besides the metal and the metal compound, which compose the whiskers or the fibers, as the alloy, for example, alloys can be mentioned, which contain cobalt, chromium, manganese, iron, nickel, titanium, vanadium, niobium, tungsten, molybdenum and the like.

Moreover, as the ceramics, for example, there can be mentioned tungsten nitride, tungsten carbide, tungsten boride, molybdenum nitride, molybdenum carbide, molybdenum boride, and the like.

Moreover, as the substrate, for example, those can also be applied, each of which includes a metal layer containing the above-mentioned constituent metal of the whiskers or the fibers on a surface thereof.

With such a configuration, a material with another composition, which is excellent in physical strength and electric conductivity, can be used as a core body while maintaining the adherence of the whiskers or the fibers onto the substrate. Accordingly, the internal resistance of the composite electrode can be reduced, and more excellent responsiveness can be exhibited. Moreover, the physical strength can also be enhanced.

Note that, as the above-described core body, for example, there can be mentioned metal such as iron, cobalt, nickel, niobium, molybdenum, platinum and titanium, high melting point ceramics such as aluminum oxide and silicon oxide, and the like.

(Production Method)

Next, a description is made below in detail of the method for producing the composite electrode for the electricity storage device according to the first embodiment of the present invention.

The method for producing the composite electrode for the electricity storage device according to the first embodiment is a first embodiment of a method for producing the above-mentioned composite electrode for an electricity storage device, and is a production method including the following steps (1) and (2):

(1) the step of performing heat treatment for a raw material or precursor of the substrate containing the constituent metal of the whiskers or the fibers in an oxidizing atmosphere, and forming the whiskers or the fibers on the substrate; and (2) after the step (1), the step of forming an active material-containing coating layer on at least a part of surfaces of the whiskers or the fibers.

With such a procedure, a desired composite electrode for an electricity storage device can be obtained.

By using, as the substrate, the one containing the constituent metal of the whiskers or the fibers, it is possible to directly form uniform whiskers, and the adherence of the whiskers or the fibers onto the substrate can be enhanced.

In the above-described step (1), the formation of the whiskers or the fibers can be performed by performing the heat treatment for the raw material or precursor of the substrate containing the constituent metal of the whiskers or the fibers at a temperature of 800 to 1600° C., for example, in inert gas with an oxygen concentration of 1 to 10000 ppm.

Note that the reason for the description "the raw material or precursor of the substrate containing the constituent metal of the whiskers or the fibers" is that the case is considered, where the raw material or the like of the substrate causes a little composition change by the heat treatment.

Moreover, an introduction amount of the inert gas is decided in response to sizes, shapes and the like of a reaction furnace and the substrate. For example, in the case where a capacity of the reaction furnace is 3 L, it is desirable that the inert gas be supplied by an approximate amount from 0.1 to 5 L per minute.

In the above-described step (2), the formation of the coating layer can be performed, for example, by using an electrolytic deposition method, a sol-gel method, a CVD method, a PVD method, a spin coat method, a spray coat method, a dip coat method and the like. Moreover, a method suitable for a composition and characteristics of the coating layer can be appropriately selected.

Among them, it is desirable to use the electrolytic deposition method. For example, in the case of forming an active material such as oxide of which electric conductivity is not particularly high, when the active material-containing coating layer is formed on surfaces of such conductive whiskers, the electric conductivity of the surfaces is sometimes decreased. Accordingly, when the coating layer is deposited to some extent, a growth speed thereof is decreased, and it becomes easy to control the formation of the active material-containing coating layer on the surfaces of the conductive whiskers.

In such a way, a composite electrode for an electricity storage device, which can exhibit stable performance, can be easily obtained.

Note that a deposition time can be appropriately adjusted in response to constituent components of the coating layer, and for example, it is desirable to perform the electrolytic deposition for manganese oxide for 1 minute to 10 hours, and for vanadium oxide for 1 minute to 20 hours.

(Electricity Storage Device)

Next, a description is made below in detail of the electricity storage device according to the first embodiment of the present invention.

The electricity storage device according to the first embodiment includes: the above-mentioned composite electrode for an electricity storage device; and electrolyte.

With such a configuration, high capacitance and excellent responsiveness can be exhibited.

Note that the composite electrode for the electricity storage device can be applied to both of a positive electrode and a negative electrode depending on the composition of the coating layer (type of the active material). For example, for the positive electrode, it is desirable to combine the one having a coating layer containing an active material that generates the capacitance stably on a high potential side. For the negative electrode, it is desirable to combine the one having a coating layer containing an active material that generates the capacitance stably on a low potential side. Moreover, for both of the electrodes, it is also possible to use those with the same composition.

The electrolyte is not particularly limited; however, for example, a non-aqueous electrolysis solution can be mentioned. The non-aqueous electrolysis solution has high withstand voltage characteristics in comparison with an aqueous electrolysis solution, and has an advantage that it is easy to obtain high capacitance. Moreover, the non-aqueous electrolysis solution has high viscosity and a slower diffusion rate in comparison with the aqueous solution. Accordingly, the non-aqueous electrolysis solution has a large advantage brought by being combined with the above-mentioned composite electrode for an electricity storage device, which is capable of being smoothly diffused in the electrode.

As a specific example of the non-aqueous electrolysis solution, an organic electrolysis solution, an ion liquid and the like can be mentioned.

Moreover, the electrolyte is not particularly limited; however, for example, it is desirable to use solid or gel-like electrolyte.

With such a configuration, there is an advantage that the electrolyte is easy to handle in terms of safety of a cell, and in terms of the cycle characteristics and the like. Moreover, in general, the solid or gel-like electrolyte has louver ion conductivity in comparison with liquid electrolyte, and accordingly, has a large advantage brought by being combined with the above-mentioned composite electrode for an electricity storage device, which has excellent responsiveness.

As a specific example of the solid or gel-like electrolyte, polymer electrolyte, gel electrolyte, solid acid electrolyte and the like can be mentioned.

A description is made below more in detail of the first embodiment of the present invention by examples and comparative examples; however, the present invention is not limited to these examples.

Example 1

A description is first made of Example 1(A). A flat plate of tungsten metal was heated up to 100° C. in an oxygen-containing argon gas flow (oxygen concentration: 1% by volume; flow rate: 15 cm³/minute (1 atm, 25° C.)), was subsequently heated up to 1100° C. at a temperature rise rate of 550° C./hour in an argon gas flow, was further held at 1100° C. for 2 hours, and was thereafter cooled down to room temperature, whereby whiskers of tungsten oxide were formed on the flat plate of the tungsten metal. Note that such an obtained electrode in which the whiskers of the tungsten oxide were formed on the flat plate of the tungsten metal is referred to as a pre-composite electrode. The pre-composite electrode had a size of 1 cm×1 cm and a thickness of 0.1 mm.

A cross-sectional scanning electron microscope (cross-sectional SEM) photograph of the obtained pre-composite electrode is shown in FIG. 1(a), and a top plan scanning electron microscope (top plan SEM) photograph of the obtained pre-composite electrode is shown in FIG. 1(b).

Moreover, when the formed whiskers were evaluated by an X-ray diffractometer (XRD), it was confirmed that the whiskers contained $W_{18}O_{49}$ as a main component. Moreover, an average length of the formed whiskers was 30 μm.

The obtained pre-composite electrode and Pt as an opposite electrode were immersed into a plating bath with a mixed aqueous solution of 1 mol/L $MnSO_4$ and 1 mol/L $Na_2SO_4$, and were subjected to electrolytic deposition at a current density of 25 mA/cm² for 2 minutes, whereby a coating layer of manganese oxide was formed, and a composite electrode for an electricity storage device in this example was obtained.

Figure 2:
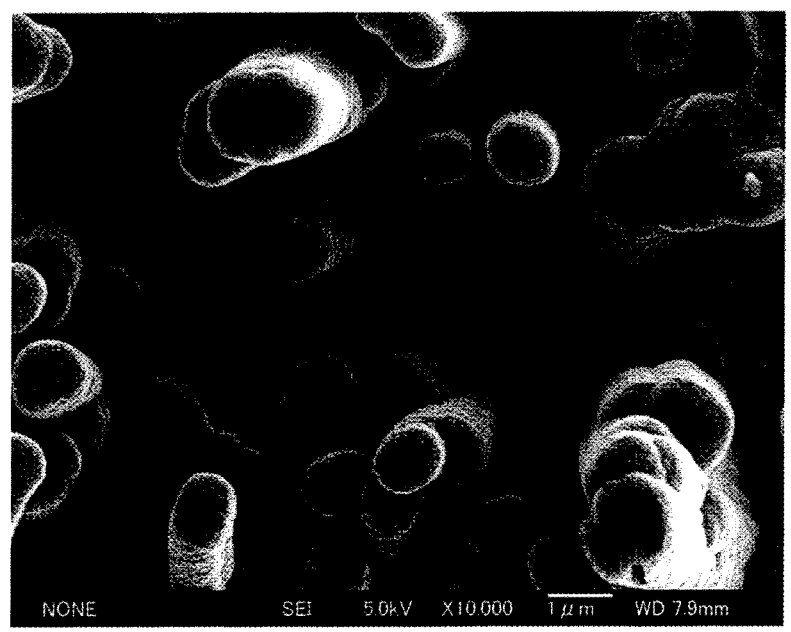
FIG. 2 is a top plan SEM photograph of a composite electrode for an electricity storage device in Example 1(A).

A top plan SEM photograph of the composite electrode for the electricity storage device in this example is shown in FIG. 2.

By using a three electrode-type cell, in which the composite electrode for the electricity storage device in this example was a test electrode, a lithium foil was an auxiliary electrode and a reference electrode, and an electrolysis solution was the one obtained by dissolving lithium perchlorate of 1 mol/L in a solvent obtained by mixing ethylene carbonate (EC) and dimethyl carbonate (DMC) with each other in a volume ratio of 50:50, performance of the composite electrode for the electricity storage device in this example was evaluated by a charge/discharge test and cyclic voltammetry (CV).

Figure 3:
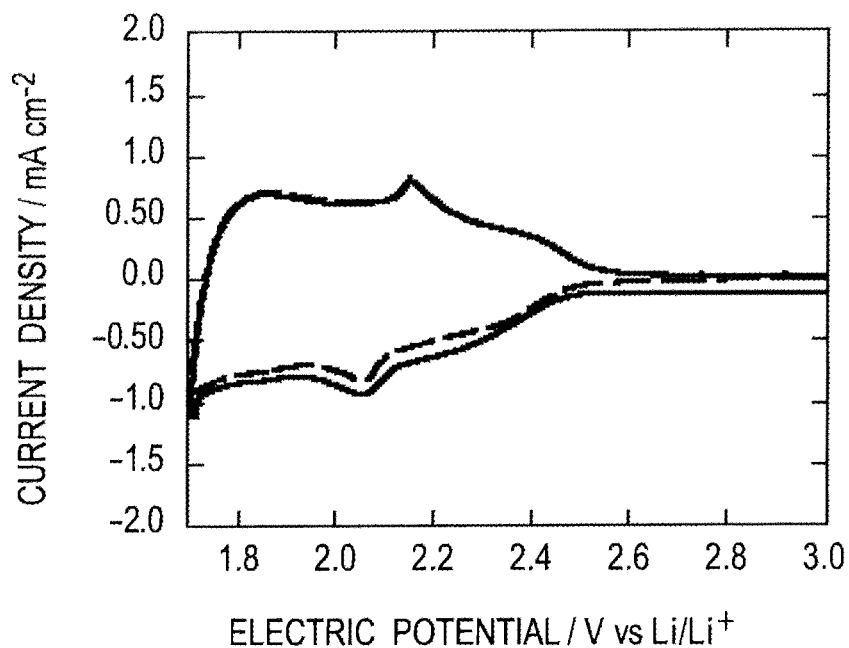
FIG. 3 is a graph showing a CV curve of the composite electrode for the electricity storage device in Example 1(A).

A CV curve of the composite electrode for the electricity storage device in this example is shown in FIG. 3.

Moreover, for comparison, by using a three electrode-type cell in which the composite electrode for the electricity storage device in this example was replaced by the pre-composite electrode obtained in this example, performance of the pre-composite electrode obtained in this example was evaluated by a charge/discharge test and cyclic voltammetry (CV).

Figure 4:
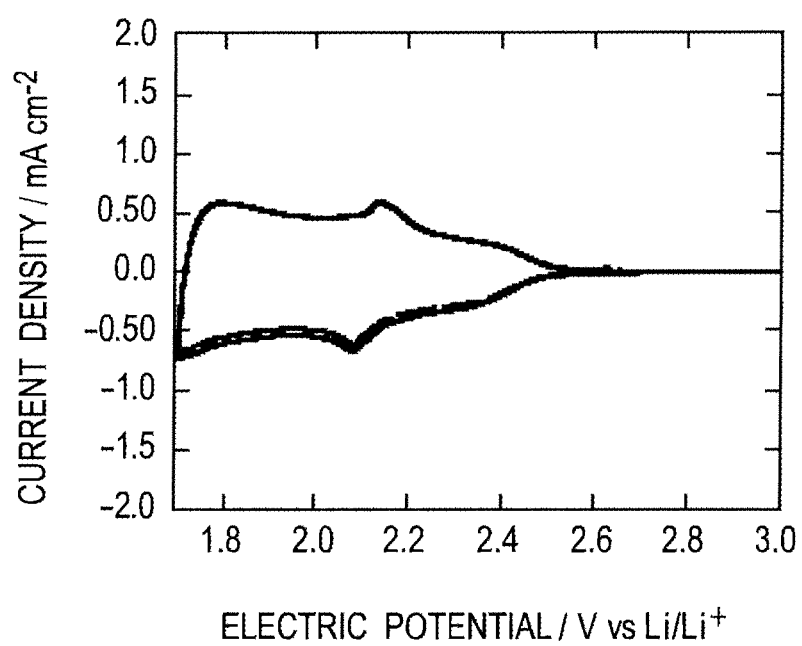
FIG. 4 is a graph showing a CV curve of the pre-composite electrode obtained in Example 1(A).

A CV curve of the obtained pre-composite electrode is shown in FIG. 4.

From FIG. 3 and FIG. 4, it is understood that the composite electrode for the electricity storage device (FIG. 3) in Example 1(A), which falls under the scope of the present invention, maintains high capacitance in comparison with the pre-composite electrode (FIG. 4) obtained in Example 1(A), which does not fall under the scope of the present invention. Moreover, from FIG. 2, it is understood that the coating layer is formed without completely filling the gaps among the whiskers. Furthermore, in CV curves (FIG. 9) of Comparative example 1 to be described later, peaks at a capacitance generating potential do not obviously appear, and a delay in responsiveness is observed. As opposed to this, in the composite electrode for the electricity storage device (FIG. 3) in Example 1(A), which falls under the scope of the present invention, the peaks at the capacitance generating potential can be confirmed at the same scanning speed in a similar way to before such a compositing process, and accordingly, it was confirmed that the composite electrode for the electricity storage device in Example 1(A) had excellent responsiveness.

Next, a description is made of Example 1(B). Similar operations to those of Example 1(A) were repeated except that the electrolytic deposition time was set at 1 hour, whereby a composite electrode for an electricity storage device in this example was obtained.

Figure 5:
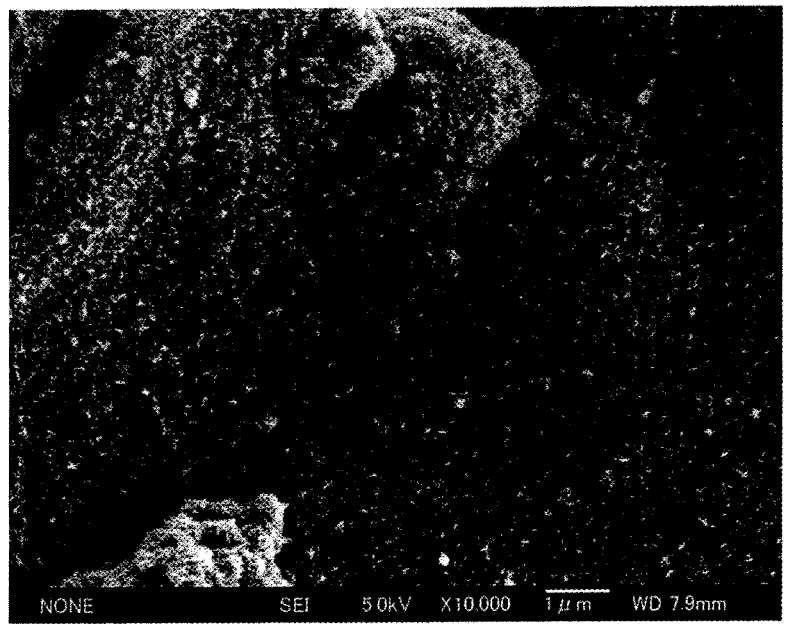
FIG. 5 is a top plan SEM photograph of a composite electrode for an electricity storage device in Example 1(B).

A top plan SEM photograph of the composite electrode for the electricity storage device in this example is shown in FIG. 5.

By using a three electrode-type cell, in which the composite electrode for the electricity storage device in this example was a test electrode, lithium foil was an auxiliary electrode and a reference electrode, and an electrolysis solution was the one obtained by dissolving lithium perchlorate of 1 mol/L in a solvent obtained by mixing ethylene carbonate (EC) and dimethyl carbonate (DMC) with each other in a volume ratio of 50:50, performance of the composite electrode for the electricity storage device in this example was evaluated by a charge/discharge test and cyclic voltammetry (CV).

Figure 6:
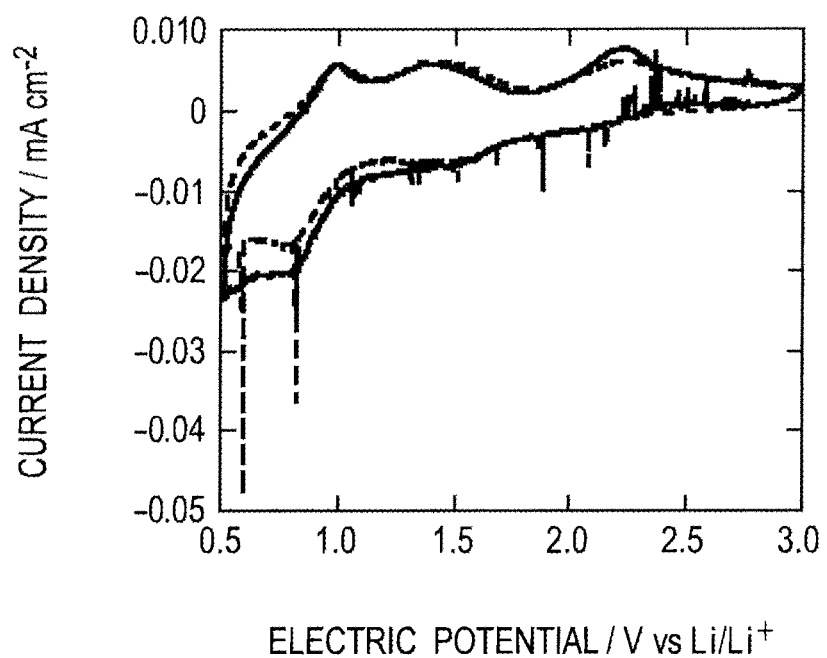
FIG. 6 is a graph showing a CV curve of a composite electrode for an electricity storage device in Example 1(B).

A CV curve of the composite electrode for the electricity storage device in this example is shown in FIG. 6.

From FIG. 6 and FIG. 4, it is understood that a potential window is extended in the composite electrode for the electricity storage device (FIG. 6) in Example 1(B), which falls under the scope of the present invention, in comparison with the pre-composite electrode (FIG. 4) obtained in Example 1(A), which does not fall under the scope of the present invention. Moreover, from FIG. 5, it was confirmed that the coating layer was formed so as to substantially completely fill the gaps among the whiskers, and that a waveform of the CV curve was proper to manganese oxide.

Example 2

A flat plate of tungsten metal was heated up to 100° C. in an oxygen-containing argon gas flow (oxygen concentration: 1% by volume; flow rate: 5 cm$^3$/minute (1 atm, 25° C.)), was subsequently heated up to 1100° C. at a temperature rise rate of 550° C./hour in an argon gas flow, was further held at 1100° C. for 2 hours, and was thereafter cooled down to room temperature, whereby whiskers of tungsten oxide were formed on the flat plate of the tungsten metal.

Figure 7:
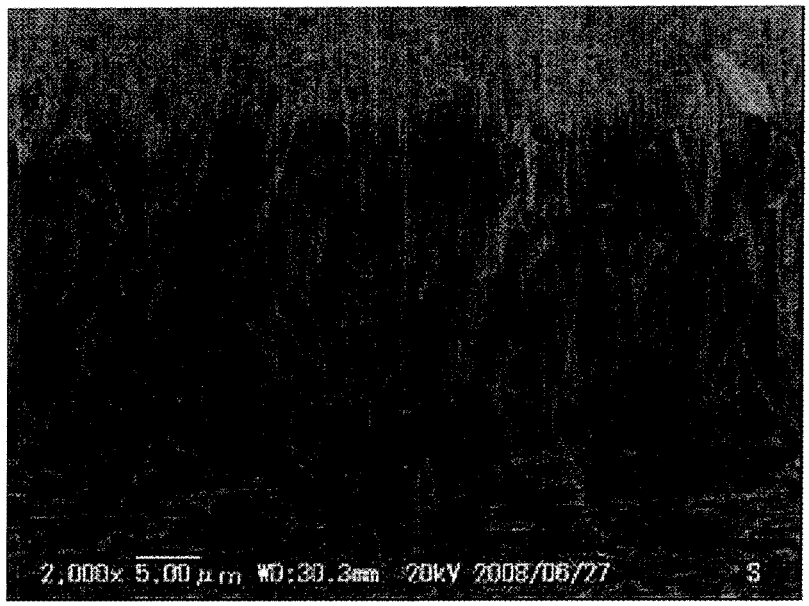
FIG. 7(a) is a cross-sectional SEM photograph of a pre-composite electrode obtained in Example 2.
FIG. 7(b) is a cross-sectional SEM photograph of a composite electrode for an electricity storage device in Example 2.
Figure 7:
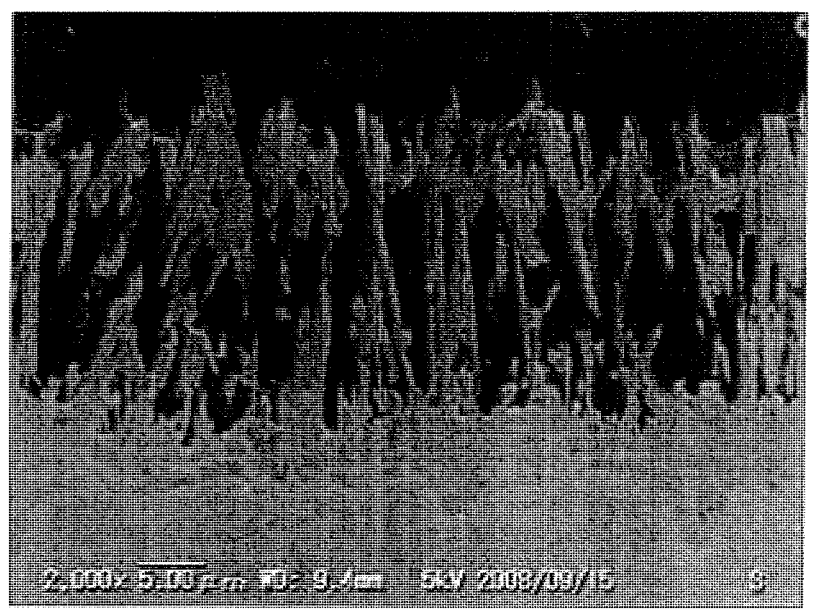

A cross-sectional SEM photograph of an obtained pre-composite electrode is shown in FIG. 7(a). When the whiskers were studied by an XRD, it was confirmed that the whiskers contained $W_{18}O_{49}$ as a main component. Moreover, an average length of the whiskers was 30 μm.

The obtained pre-composite electrode and Pt as an opposite electrode were immersed into a plating bath with an aqueous solution of 1 mol/L $VOSO_4$, and were subjected to electrolytic deposition at a current density of 25 mA/cm$^2$ for 2 hours, whereby a coating layer of vanadium oxide was formed, and a composite electrode for an electricity storage device in this example was obtained.

A cross-sectional SEM photograph of the composite electrode for the electricity storage device in this example is shown in FIG. 7(b). Note that, at the time of obtaining the cross-sectional SEM photograph of FIG. 7(b), a sample was solidified by resin, and a cross section thereof was polished.

By using a three electrode-type cell, in which the composite electrode for the electricity storage device in this example was a test electrode, lithium foil was an auxiliary electrode and a reference electrode, and an electrolysis solution was the one obtained by dissolving lithium perchlorate of 1 mol/L in a solvent obtained by mixing ethylene carbonate (EC) and dimethyl carbonate (DMC) with each other in a volume ratio of 50:50, performance of the composite electrode for the electricity storage device in this example was evaluated by a charge/discharge test and cyclic voltammetry (CV).

Moreover, for comparison, by using a three electrode-type cell in which the composite electrode for the electricity storage device in this example was replaced by the pre-composite electrode obtained in this example, performance of the pre-composite electrode obtained in this example was evaluated by a charge/discharge test and cyclic voltammetry (CV).

Figure 8:
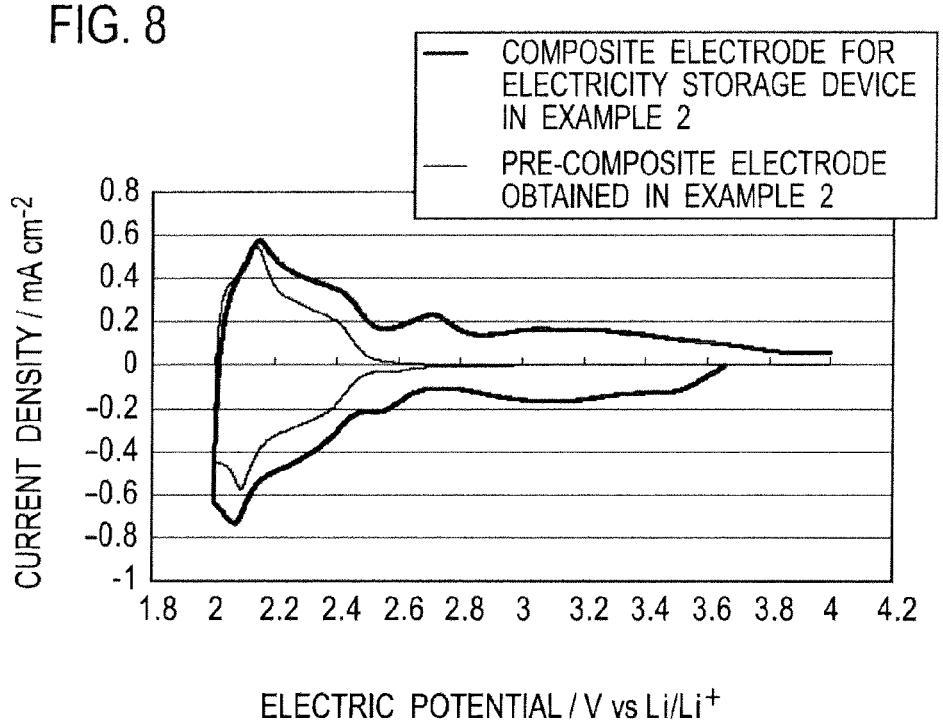
FIG. 8 is a graph showing CV curves of the composite electrode for the electricity storage device in Example 2 and the pre-composite electrode obtained in Example 2.

CV curves of the obtained composite electrode for an electricity storage device and the obtained pre-composite electrode are shown in FIG. 8.

From FIG. 8, it is understood that the composite electrode for the electricity storage device in Example 2, which falls under the scope of the present invention, maintains high capacitance in comparison with the pre-composite electrode obtained in Example 2, which does not fall under the scope of the present invention. Moreover, from FIG. 7(b), it is understood that the coating layer is formed without completely filling the gaps among the whiskers. Furthermore, in the CV curves (FIG. 9) of Comparative example 1 to be described later, the peaks at the capacitance generating potential do not obviously appear, and the delay in responsiveness is observed. As opposed to this, in the composite electrode for the electricity storage device in Example 2, which falls under the scope of the present invention, the peaks at the capacitance generating potential can be confirmed at the same scanning speed in a similar way to before the compositing process, and accordingly, it was confirmed that the composite electrode for the electricity storage device in Example 2 had excellent responsiveness.

Comparative Example 1

A pellet electrode of tungsten oxide was fabricated by mixing an active material, an electrically-conductive agent and a binder with one another in a mass ratio of 8:1:1, in which the active material was the tungsten oxide whiskers containing $W_{18}O_{49}$ as a main component, the electrically-conductive agent was acetylene black, and the binder was polytetrafluoroethylene (PTFE).

By using a three electrode-type cell, in which the obtained pellet electrode was a test electrode, lithium foil was an auxiliary electrode and a reference electrode, and an electrolysis solution was the one obtained by dissolving lithium perchlorate of 1 mol/L in a solvent obtained by mixing ethylene carbonate (EC) and dimethyl carbonate (DMC) with each other in a volume ratio of 50:50, performance of the pellet electrode was evaluated by a charge/discharge test and cyclic voltammetry (CV).

Figure 9:
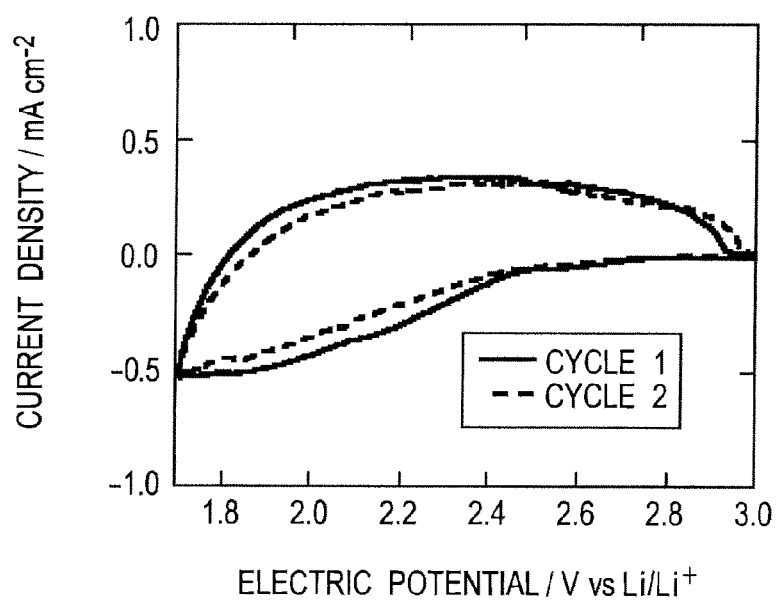
FIG. 9 is a graph showing a CV curve of a pellet electrode in Comparative example 1.

The CV curves of the obtained pellet electrode are shown in FIG. 9.

From FIG. 3, FIG. 6, FIG. 8 and FIG. 9, it is understood that, while the peaks at the capacitance generating potential do not obviously appear and the delay in responsiveness is observed in the CV curves of Comparative example 1 (FIG. 9) that does not fall under the scope of the present invention, the peaks can be confirmed at the same scanning speed in a similar way to before the composition process in Example 1(A) (FIG. 3) and Example 2 (FIG. 8), which fall under the scope of the present invention, and accordingly, excellent responsiveness is exhibited therein. In particular, with regard to Example 2 (FIG. 8), it is understood that capacitance per unit electrode area is increased. Moreover, it is understood that Example 1(B) (FIG. 6) has a wider usable voltage range of the electrode than Comparative example 1 (FIG. 9). From these results, it can be said that it becomes possible to design an electricity storage device, which satisfies desired performance (voltage range where the capacitance is desired to be generated, and responsiveness), by adjusting compositing conditions for the electrode in the present invention.

Second Embodiment

A description is made below in detail of a composite electrode for an electricity storage device according to a second embodiment of the present invention, a method for producing the composite electrode, and the electricity storage device.

First, a description is made below in detail of the composite electrode for the electricity storage device according to the second embodiment.

The composite electrode for the electricity storage device according to the second embodiment includes: a substrate; whiskers or fibers, which are formed on a surface of the substrate, and contain at least one of metal and a metal compound; and a coating layer, which is formed on surfaces of the whiskers or the fibers, contains an active material, and has concavities and convexities on a surface thereof.

With such a configuration, a surface area of the coating layer is increased several times to several ten times that of the case of only such whiskers in which the surfaces are flat, and high capacitance can be generated. Moreover, when a surface area of the composite electrode for the electricity storage device is increased by the coating layer, internal resistance almost equivalent to that of the case of whisker morphological control (aspect ratio control for the whiskers) is exhibited, and it is possible to exhibit excellent responsiveness.

Moreover, in the coating layer having the concavities and convexities on the surface thereof, a part of protruding portions may contact other protruding portions and the surface of the coating layer. In this case, the coating layer having the concavities and convexities on the surface can also be said to be a porous coating layer.

Moreover, in the second embodiment, it is desirable that a surface area of the active material per unit volume before the formation of the coating layer be larger than a surface area of the active material per unit volume after the formation of the coating layer.

For example, in the case where the coating layer made of the active material is formed on the surfaces of the whiskers or the fibers, an amount of the active material is increased without exception. However, if the surface of the coating layer is not increased correspondingly to the increase of the active material, then it is difficult to exhibit high capacitance and excellent responsiveness. Such high capacitance and excellent responsiveness can be achieved by forming the coating layer having the concavities and convexities onto the surfaces of the whiskers or the like.

In order to strike a balance between high capacitance and excellent responsiveness in a higher order, t is desirable that the concavities and convexities on the surface of the coating layer, which are as described above, satisfy conditions to have the shapes as below with a good balance.

For example, it is desirable that the concavities and convexities be those in which a diffusion dimension from the electrolysis solution to the surface of the electrode is high-order, and specifically, have a linear shape (needle shape), a hemispherical shape and a dot shape rather than a planar shape. Moreover, it is desirable that such minute concavities and convexities be those in which a diffusion distance in an inside of the coating layer is short, and specifically, be fine. Furthermore, it is desirable that the concavities and convexities be those which reduce the resistance in the whole of the electrode, and specifically, in which a distance to the current collectors is short, in other words, which are not long as one structure.

The minute concavities and convexities are formed on the surface of the electrode as described above, whereby, for example, diffusion of ions (for example, $Li^+$) in the electrolysis solution becomes smooth, and further, a space can be efficiently used by the whiskers or the like. Accordingly, a space-filling structure exhibiting excellent responsiveness is formed.

Moreover, in the second embodiment, it is desirable that an increment of internal resistance of the composite electrode after the formation of the coating layer is smaller than an increment of the internal resistance after morphological control for the whisker or the fiber, the morphological control is for setting a surface area of the whisker or the fiber before the formation of the coating layer at a same surface area of the composite electrode after the formation of the coating layer.

It is relatively easy to increase the surface area from before the formation of the coating layer, for example, to approximately 3.3 times by forming the coating layer having the concavities and convexities on the surface.

In the case of ensuring the equivalent surface area only by the morphological control for the whiskers (that is, aspect ratio control for the whiskers), for example, there are conceived: (1) to extend the length of the whiskers to approximately 3.3 times; (2) to thin a thickness of the whiskers to approximately $1/3.3$, and densely arrange the whiskers in a similar way to the conventional; and the like. In the case of (1), theoretically, resistance per whisker is increased to approximately 3.3 times, and in the case of (2), theoretically, the resistance per whisker is increased to approximately 10 times.

However, in the case of increasing the surface area by forming the coating layer, it is not necessary to extend the length of the whiskers, and it is possible to suppress the increment of the internal resistance to a low level. Accordingly, the obtained electrode becomes capable of generating high capacitance and excellent responsiveness.

The coating layer is not particularly limited as long as the coating layer is formed on the surfaces of the whiskers or the fibers, contains the active material, and has the concavities and convexities on the surface thereof. For example, it is desirable that the coating layer be formed on the substantially entire surfaces of the whiskers or the fibers. With such a configuration, in the case where the whiskers are used at a potential exceeding a stable potential range, the effects exerted by the present invention can be exhibited more stably. However, the present invention is not limited to this, and for example, such a coating layer, which is formed on a part of the surfaces of the whiskers or the fibers, is also incorporated in the scope of the present invention.

(Production Method)

Next, a description is made in detail of a method for producing the composite electrode for the electricity storage device according to the second embodiment of the present invention.

The method for producing the composite electrode for the electricity storage device according to the second embodiment is substantially similar to the method for producing the composite electrode for the electricity storage device according to the first embodiment, and only differences therebetween are descried next.

The method for producing the composite electrode for the electricity storage device according to the second embodiment is a second embodiment of the method for producing the above-mentioned composite electrode for an electricity storage device, and is a production method including the following steps (1) and (2):

(1) the step of performing heat treatment for a raw material or precursor of the substrate containing the constituent metal of the whiskers or the fibers in an oxidizing atmosphere, and forming the whiskers or the fibers on the substrate; and
(2) after the step (1), the step of forming an active material-containing coating layer having the concavities and convexities on the surfaces of the whiskers or the fibers.

With such a procedure, a desired composite electrode for an electricity storage device can be obtained.

In the above-described step (2), the formation of the coating layer can be performed, for example, by using an electrolytic deposition method, a sol-gel method, a CVD method, a PVD method, a spin coat method, a spray coat method, a dip coat method and the like. Moreover, a method suitable for a composition and characteristics of the coating layer can be appropriately selected.

Among them, it is desirable to use the electrolytic deposition method. For example, in the case of forming an active material such as oxide of which electric conductivity is not particularly high, when the active material-containing coating layer is formed on surfaces of such conductive whiskers, the electric conductivity of the surfaces is sometimes decreased. Accordingly, when the coating layer is deposited to some extent, a growth speed thereof is decreased, and it becomes easy to control the formation of the active material-containing coating layer having the concavities and convexities on the surface.

In such a way, a composite electrode for an electricity storage device, which can exhibit stable performance, can be easily obtained.

Note that a deposition time and a current density can be appropriately adjusted in response to constituent components of the coating layer. For example, in the case of forming a coating layer that contains vanadium oxide VOx ($VO_2$, $V_2O_3$, $V_2O_5$ and the like) as the active material and has the concavities and convexities on the surface, it is desirable to perform electrolytic deposition in which the current density is set in a range from 0.1 to 100 $mA/cm^2$. In the case where the current density is extremely large, it becomes difficult to control the coating layer owing to an occurrence of a side reaction, and the like, and in addition, the surface properties are deteriorated, it sometimes becomes impossible to perform high-speed charge/discharge of the composite electrode. Meanwhile, in the case where the current density is low, it takes an extremely long time for the deposition, and this is not desirable. The deposition time just needs to be decided in accordance with the current density; however, preferably ranges from 6 minutes to 100 hours.

(Electricity Storage Device)

Next, a description is made below of the electricity storage device according to the second embodiment.

The electricity storage device of the second embodiment includes: the above-mentioned composite electrode for an electricity storage device; and an electrolyte. The electricity storage device of the second embodiment is basically the same as the electricity storage device of the first embodiment, and accordingly, details thereof are omitted.

A description is made below more in detail of the second embodiment of the present invention by examples and comparative examples; however, the present invention is not limited to these examples.

Example 3

A flat plate of tungsten metal was heated up to 100° C. in an oxygen-containing argon gas flow (oxygen concentration: 1% by volume; flow rate: 15 $cm^3$/minute (1 atm, 25° C.)), was subsequently heated up to 1100° C. at a temperature rise rate of 550° C./hour in an argon gas flow, was further held at 1100° C. for 2 hours, and was thereafter cooled down to room temperature, whereby whiskers of tungsten oxide were formed on the flat plate of the tungsten metal. Note that such an obtained electrode in which the whiskers of the tungsten oxide were formed on the flat plate of the tungsten metal is referred to as a pre-composite electrode. The pre-composite electrode had a size of 1 cm×1 cm and a thickness of 0.1 mm.

Figure 10:
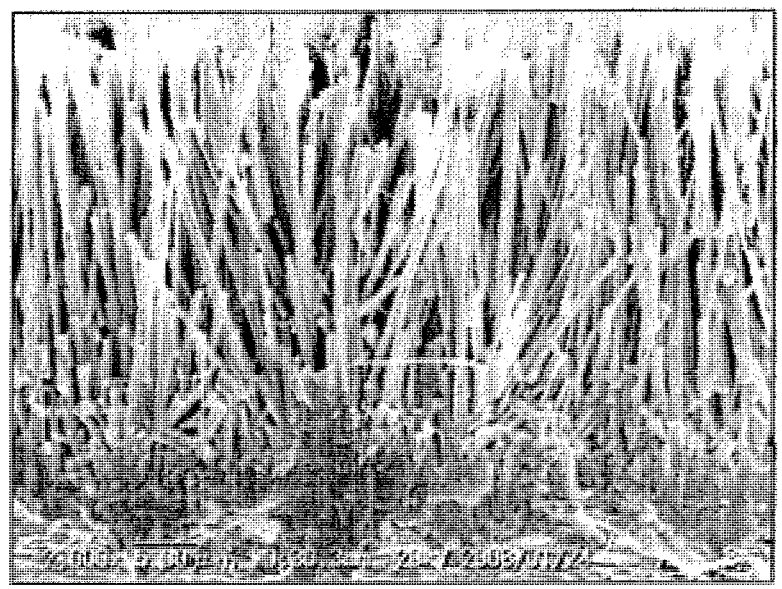
FIG. 10(a) is a cross-sectional SEM photograph of a pre-composite electrode obtained in Example 3.
FIG. 10(b) is a top plan SEM photograph thereof.
Figure 10:
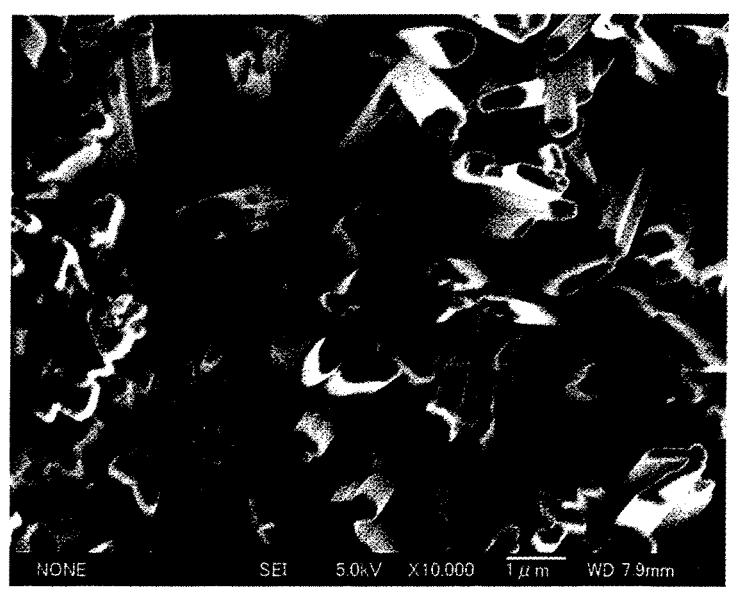

A cross-sectional scanning electron microscope (cross-sectional SEM) photograph of the obtained pre-composite electrode is shown in FIG. 10(a), and a top plan scanning electron microscope (top plan SEM) photograph of the obtained pre-composite electrode is shown in FIG. 10(b).

Moreover, when the formed whiskers were evaluated by an X-ray diffractometer (XRD), it was confirmed that the whiskers contained $W_{18}O_{49}$ as a main component. Moreover, an average length of the formed whiskers was 30 μm.

The obtained pre-composite electrode and Pt as an opposite electrode were immersed into a plating bath with an aqueous solution of 1 mol/L $VOSO_4$, and were subjected to electrolytic deposition at a current density of 2.5 $mA/cm^2$ for 2 hours, whereby a composite electrode for an electricity storage device in this example was obtained.

Figure 11:
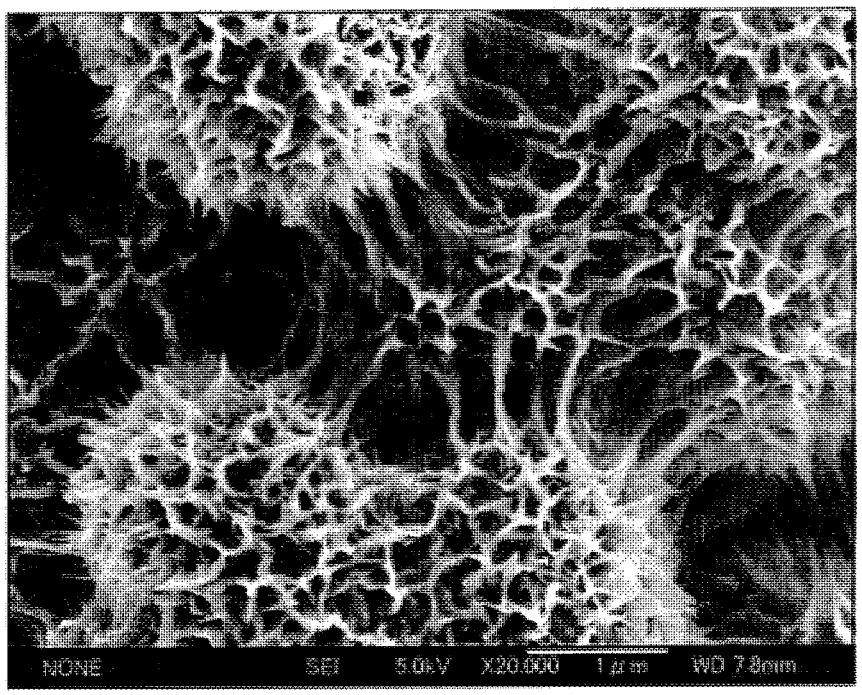
FIG. 11 is a top plan SEM photograph of a composite electrode for an electricity storage device in Example 3.

A top plan SEM photograph of the composite electrode for the electricity storage device in this example is shown in FIG. 11.

Example 4

The pre-composite electrode obtained in Example 3 and Pt as an opposite electrode were immersed into a plating bath with an aqueous solution of 1 mol/L $VOSO_4$, and were subjected to electrolytic deposition at a current density of 5 $mA/cm^2$ for 1 hour, whereby a composite electrode for an electricity storage device in this example was obtained.

Figure 12:
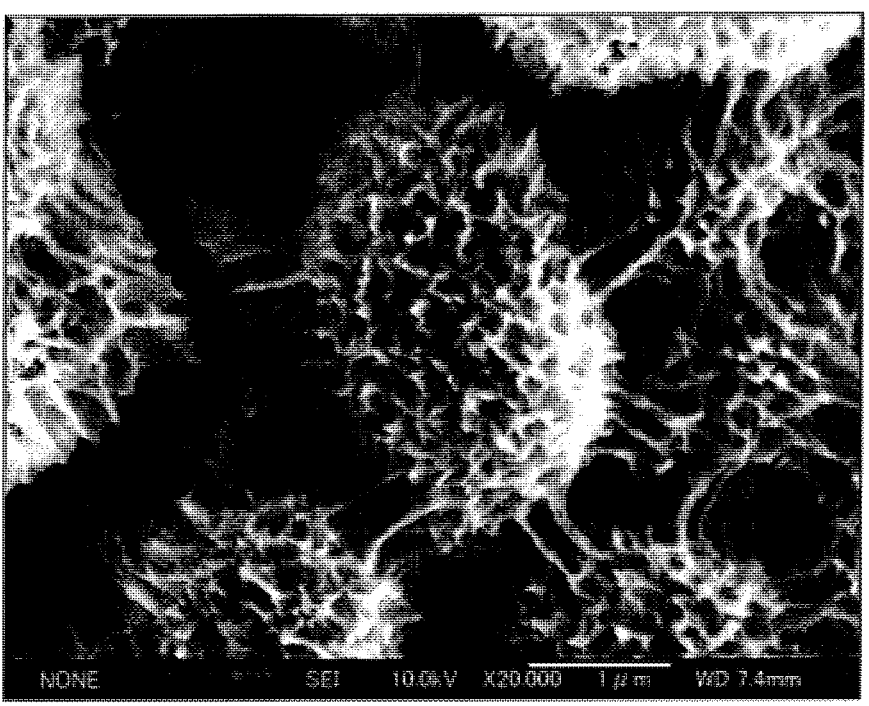
FIG. 12 is a top plan SEM photograph of a composite electrode for an electricity storage device in Example 4.

A top plan SEM photograph of the composite electrode for the electricity storage device in this example is shown in FIG. 12.

Example 5

The pre-composite electrode obtained in Example 3 and Pt as an opposite electrode were immersed into a plating bath with an aqueous solution of 1 mol/L $VOSO_4$, and were subjected to electrolytic deposition at a current density of 10 $mA/cm^2$ for 0.5 hour, whereby a composite electrode for an electricity storage device in this example was obtained.

Figure 13:
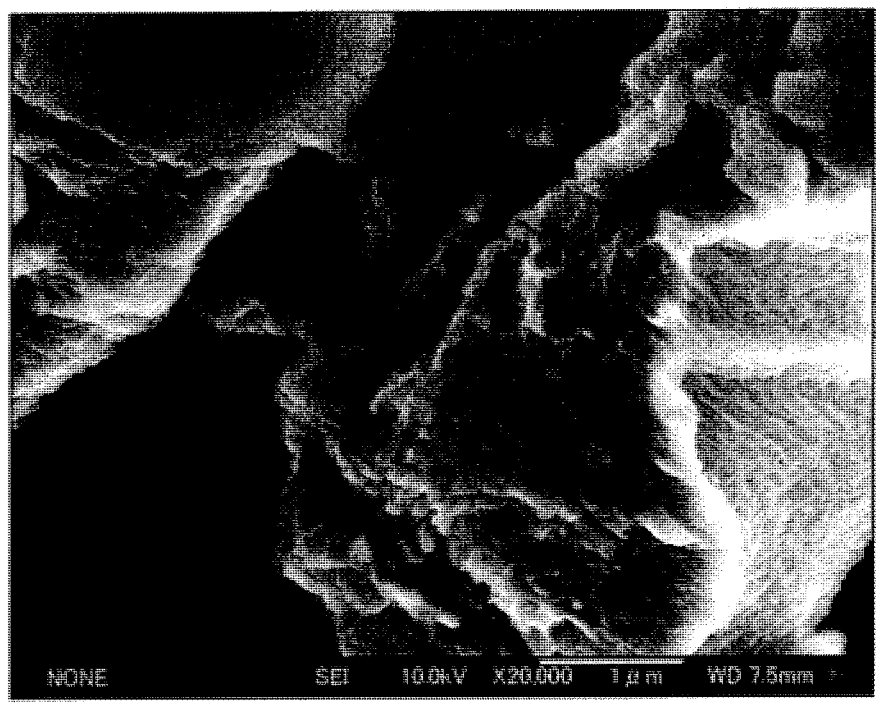
FIG. 13 is a top plan SEM photograph of a composite electrode for an electricity storage device in Example 5.

A top plan SEM photograph of the composite electrode for the electricity storage device in this example is shown in FIG. 13.

[Performance Evaluation (1)] using each of three electrode-type cells, in each of which the composite electrode for the electricity storage device in any of the above-described Examples 3 to 5 was a test electrode, lithium foil was an auxiliary electrode and a reference electrode, and an electrolysis solution was the one obtained by dissolving lithium perchlorate of 1 mol/L in a solvent obtained by mixing ethylene carbonate (EC) and dimethyl carbonate (DMC) with each other in a volume ratio of 50:50, performance of the composite electrode for the electricity storage device in each example was evaluated by a charge/discharge test and cyclic voltammetry (CV).

Figure 14:
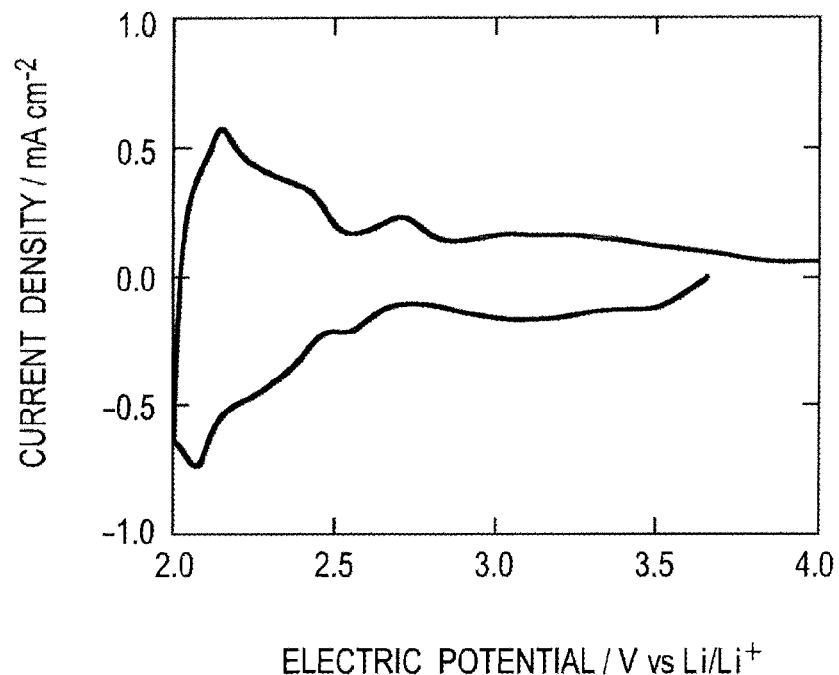
FIG. 14 is a graph showing a CV curve of the composite electrode for the electricity storage device in Example 3.
Figure 15:
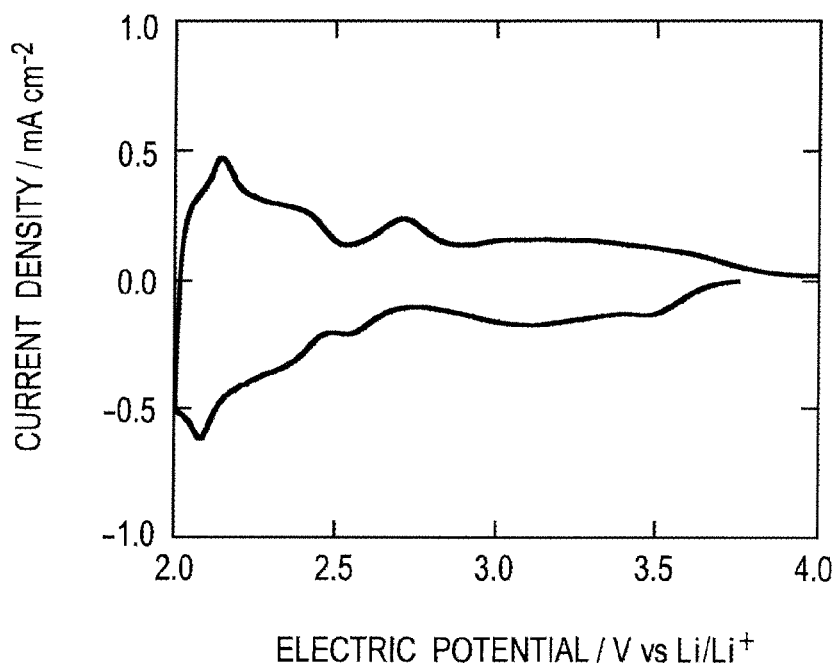
FIG. 15 is a graph showing a CV curve of the composite electrode for the electricity storage device in Example 4.
Figure 16:
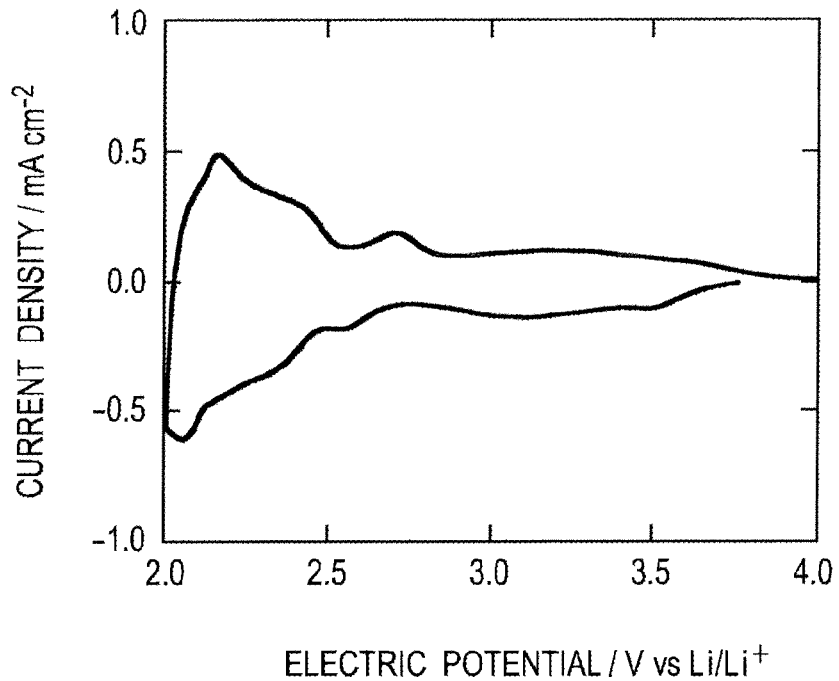
FIG. 16 is a graph showing a CV curve of the composite electrode for the electricity storage device in Example 5.

CV curves of the composite electrodes for an electricity storage device in the above-described Examples 3 to 5 are shown in FIGS. 14 to 16.

Moreover, for comparison, by using a three electrode-type cell in which the composite electrode for the electricity storage device in Example 3 was replaced by the pre-composite electrode obtained in Example 3, performance of the pre-composite electrode obtained in Example 3 was evaluated by a charge/discharge test and cyclic voltammetry (CV).

Figure 17:
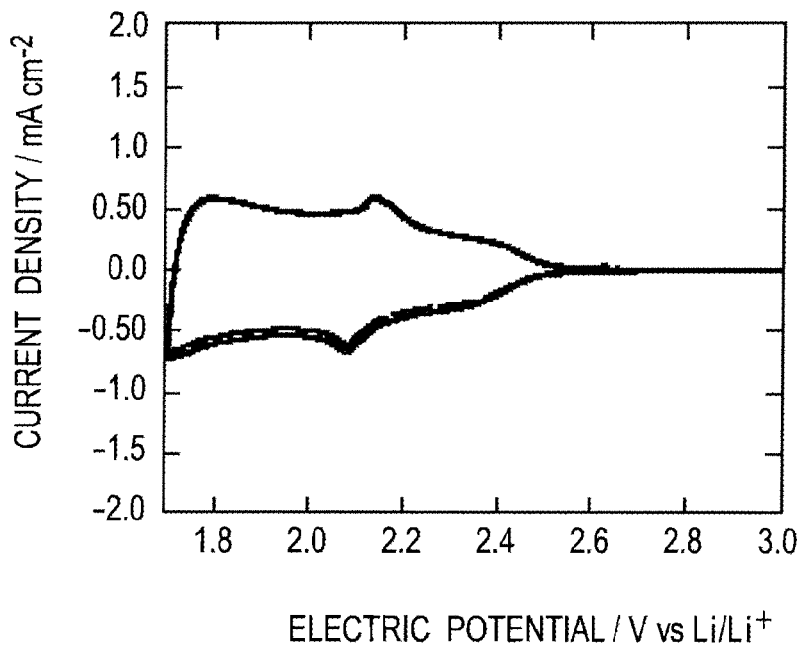
FIG. 17 is a graph showing a CV curve of the pre-composite electrode obtained in Example 3.

A CV curve of the pre-composite electrode obtained in Example 3 is shown in FIG. 17.

From FIGS. 11 to 13 and FIGS. 14 to 16, it is conceived that, when the current density at the time of the electrolytic deposition is high, the surface of the electrode is smoothed, and a deposition amount of vanadium is reduced by the side reaction.

Meanwhile, it is conceived that, in the case where the current density at the time of the electrolytic deposition is low, the surface area is expanded, but the diffusion distance in the solid is extended, and accordingly, the characteristics of the high-speed charge/discharge are inferior even if the capacitance is maintained.

Moreover, from FIGS. 14 to 17, it is understood that, in comparison with the pre-composite electrode (FIG. 17) obtained in Example 3, which does not fall under the scope of the present invention, in each of the composite electrodes for an electricity storage device (FIGS. 14 to 16) in Examples 3 to 5, which fall under the scope of the present invention, the surface area is increased, and the capacitance is enhanced.

[Performance Evaluation (2)]

By using each of three electrode-type cells, in each of which the composite electrode for the electricity storage device in any of Examples 3 to 5 or the pre-composite electrode obtained in Example 3 was a test electrode, lithium foil was an auxiliary electrode and a reference electrode, and an electrolysis solution was the one obtained by dissolving lithium perchlorate of 1 mol/L in a solvent obtained by mixing ethylene carbonate (EC) and dimethyl carbonate (DMC) with each other in a volume ratio of 50:50, evaluation for C-rate characteristics was performed. Note that, with regard to definition of C-rates, constant current charges (rates: 1 C) were individually defined at 1.03 mA for the one subjected to the electrolytic deposition at 2.5 mA/cm$^2$, at 0.99 mA for the one subjected to the electrolytic deposition at 5 mA/cm$^2$, and at 0.91 mA for the one subjected to the electrolytic deposition at 10 mA/cm$^2$. The charges were always performed at 1 C. With regard to currents at the time of charge, similar current values to those at the time of discharge are defined as 1 C. One cycle was made by starting a constant current discharge of 1 C and allowing 3 hours to follow as a relaxation time after the discharge. Then, the current density was increased for each cycle, and the constant current charge was repeated, and then a capacitance (holding rate) change at the time when the rate was increased was evaluated while taking capacitance at 1 C as 100%.

Figure 18:
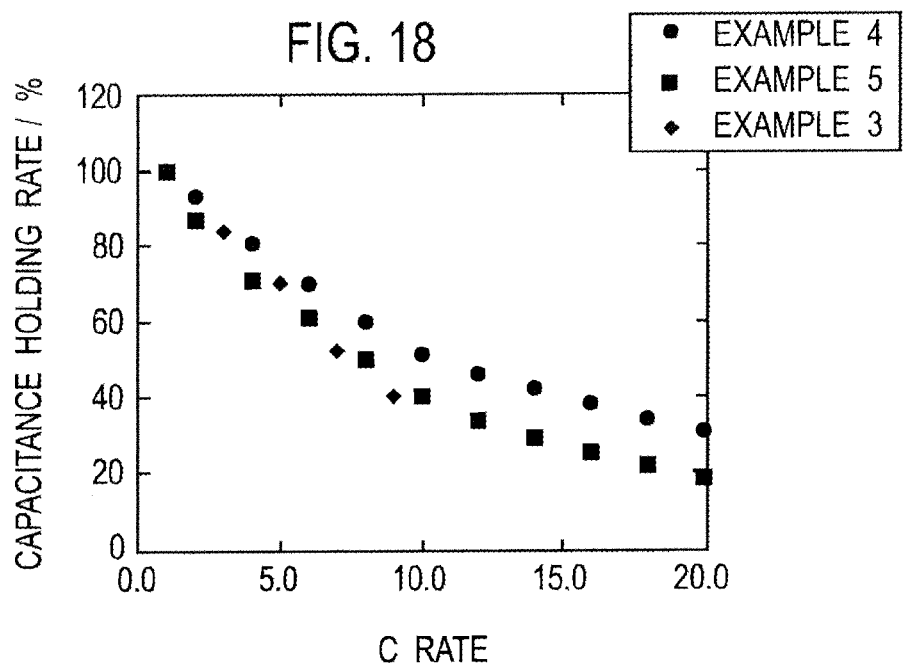
FIG. 18 is a graph showing results of rate characteristics of the composite electrodes for an electricity storage device in Example 3 to Example 5.

Obtained rate characteristic results are shown in FIG. 18.

From FIG. 18, it is understood that the rate characteristics of the composite electrodes for an electricity storage device in Examples 3 to 5 are changed by the electrolytic deposition conditions therefor.

[Performance Evaluation (3)]

Moreover, impedances of the composite electrodes for an electricity storage device in Examples 3 to 5 and the pre-composite electrode obtained in Example 3 were measured under the following conditions. Specifically, by using lithium foil as an auxiliary electrode and a reference electrode, and by using, as an electrolysis solution, the one obtained by dissolving LiBF$_4$ in a solvent obtained by mixing ethylene carbonate (EC) and propylene carbonate (PC) with each other in a volume ratio of 50:50 so that a concentration of LiBF$_4$ could become 2 mol/L, the impedances were evaluated by an alternating-current impedancemetry method in the case of giving a potential difference of 10 mV at a frequency of 1 MHz to 0.1 Hz at an open circuit voltage (OCP).

Figure 19:
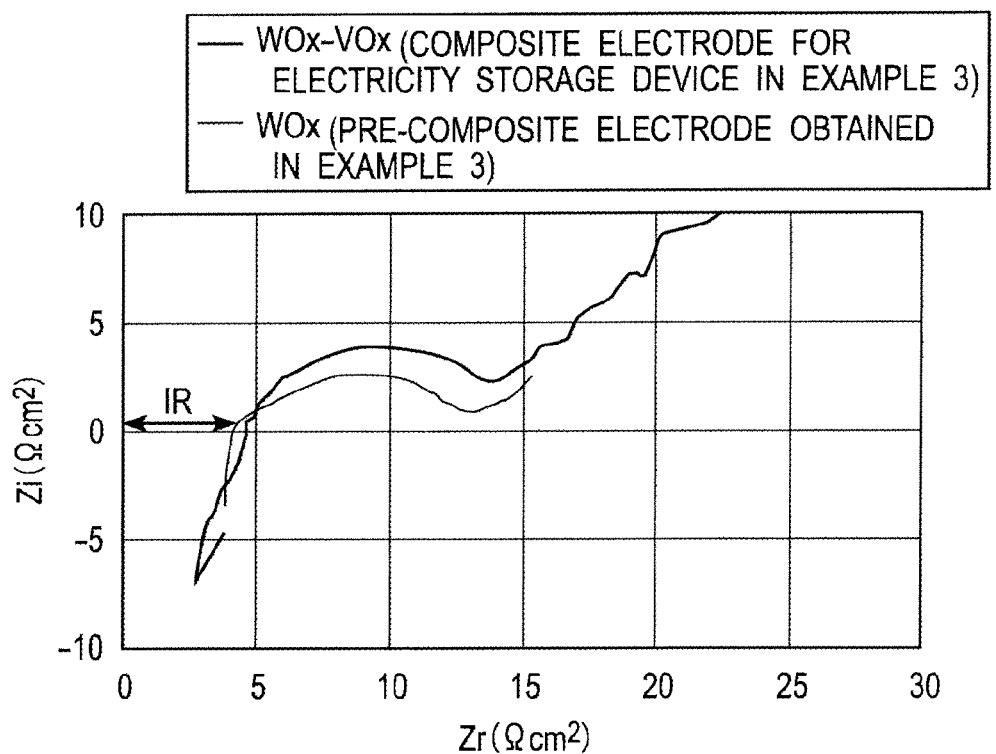
FIG. 19 is a graph showing results of impedance measurement for the composite electrode for the electricity storage device in Example 3 and the pre-composite electrode obtained in Example 3.

With regard to the composite electrode for the electricity storage device in Example 3 and the pre-composite electrode obtained in Example 3, obtained results are shown in FIG. 19.

From FIG. 19, it is understood that, in comparison with the pre-composite electrode obtained in Example 3, which does not fall under the scope of the present invention, the composite electrode for the electricity storage device in Example 3, which falls under the scope of the present invention, exhibits equivalent internal resistance (IR), and has excellent responsiveness.

The description has been made above of the present invention by some embodiments and examples; however, the present invention is not limited to these, and is modifiable in various ways within the scope of the spirit of the present invention.

For example, in the above-described embodiments, the description has been made of the case where the composite electrode for the electricity storage device is applied to the lithium-ion battery. However, the composite electrode for the electricity storage device can also be applied to an electric double layer-type capacitor, an electrochemical capacitor, and other chargeable electricity storage devices.

The entire contents of Japanese Patent Application No. 2008-275610 (filed on: Oct. 27, 2008) and Japanese Patent Application No. 2009-119613 (filed on: May 18, 2009) are incorporated herein by reference, and are protected from erroneous translation and omissions.

INDUSTRIAL APPLICABILITY

In accordance with the present invention, such a configuration is adopted, which includes: the substrate, the whiskers or the fibers which are formed on the substrate and are made of at least one of the metal and the metal compound; and the active material-containing coating layer formed on at least a part of the surfaces of the whiskers or the fibers. Accordingly, there can be provided the composite electrode for the electricity storage device, which is capable of generating high capacitance and excellent responsiveness, the method for producing the composite electrode for the electricity storage device, and the electricity storage device using the composite electrode for the electricity storage device.

The invention claimed is:

1. A composite electrode for an electricity storage device, comprising:
   a substrate;
   a whisker or a fiber made of tungsten oxide or molybdenum oxide, the whisker or the fiber being formed on the substrate; and
   a coating layer containing an active material which comprises, as a main component, oxide of at least one selected from the group consisting of manganese, nickel, indium, vanadium, cobalt, titanium and ruthenium, the coating layer being formed on at least a part of a surface of the whisker or the fiber, wherein concavities and convexities are provided on a surface of the coating layer.

2. A composite electrode for an electricity storage device according to claim 1, wherein the whisker or the fiber has higher electric conductivity than the active material.

3. A composite electrode for an electricity storage device according to claim 1, wherein the coating layer is formed on substantial entirety of the surface of the whisker or the fiber.

4. A composite electrode for an electricity storage device according to claim 1, wherein a plurality of the whiskers or a plurality of the fibers are provided, and gaps are provided among portions of the coating layer formed on the surfaces of the adjacent whiskers or fibers.

5. A composite electrode for an electricity storage device according to claim 1, wherein a surface area of the active material per unit volume before formation of the coating layer is larger than a surface area of the active material per unit volume after the formation of the coating layer.

6. A composite electrode for an electricity storage device according to claim 1, wherein an increment of internal resistance of the composite electrode after the formation of the coating layer is smaller than an increment of the internal resistance after morphological control for the whisker or the fiber, the morphological control being for setting a surface area of the whisker or the fiber before the formation of the coating layer at a same surface area of the composite electrode after the formation of the coating layer.

7. A composite electrode for an electricity storage device according to claim 1, wherein the whisker or the fiber has a structure of $W_{18}O_{49}$ as a main component.

8. A composite electrode for an electricity storage device according to claim 1, wherein the substrate is made of at least one of an alloy and ceramics, the alloy and the ceramics containing at least one of tungsten and molybdenum.

9. A composite electrode for an electricity storage device according to claim 1, wherein the substrate includes, on a surface thereof, a metal layer containing at least one of tungsten and molybdenum.

10. An electricity storage device comprising:
a composite electrode for an electricity storage device according to claim 1; and
an electrolyte.

11. An electricity storage device according to claim 10, wherein the electrolyte is a non-aqueous electrolysis solution.

12. An electricity storage device according to claim 10, wherein the electrolyte is solid or gel-like.

13. A method for producing a composite electrode for an electricity storage device, the composite electrode being according to claim 1, the method comprising the step of:
(1) performing heat treatment for a raw material or a precursor of the substrate containing at least one of tungsten and molybdenum in an oxidizing atmosphere, and forming the whisker or the fiber on the substrate; and
(2) after the step (1), forming the coating layer containing the active material on at least a part of the surface of the whisker or the fiber by an electrolytic deposition method.

14. A composite electrode for an electricity storage device according to claim 1, wherein needle-shaped concavities and convexities are provided on the surface of the coating layer.

* * * * *